O. P. SMITH.
DOG RACING AMUSEMENT.
APPLICATION FILED AUG. 28, 1920.

1,410,842.

Patented Mar. 28, 1922.
2 SHEETS—SHEET 1.

Owen P. Smith
By Chester W. Brown
his Atty.

O. P. SMITH.
DOG RACING AMUSEMENT.
APPLICATION FILED AUG. 28, 1920.

1,410,842.

Patented Mar. 28, 1922.
2 SHEETS—SHEET 2.

Owen P. Smith
By Chester W. Brown
his Atty

UNITED STATES PATENT OFFICE.

OWEN P. SMITH, OF CHICAGO, ILLINOIS.

DOG-RACING AMUSEMENT.

1,410,842.  Specification of Letters Patent.  Patented Mar. 28, 1922.

Application filed August 28, 1920. Serial No. 406,657.

*To all whom it may concern:*

Be it known that I, OWEN P. SMITH, a citizen of the United States, residing at the city of Chicago, in the county of Cook and State of Illinois, have invented certain new and useful Improvements in Dog-Racing Amusements, of which the following is a specification.

The object of my invention is to provide a new and improved race track, where dogs, and other animals may be raced, unencumbered by harness, or other equipment for guiding or driving them, thus permitting them to run free and at their highest speed.

My invention consists of a suitable race track for dogs and other animals, with means for conveying a suitable lure, or dummy animal around the track in advance of the dogs to attract the dogs to follow it with the view of catching it, as in the usual chase of the hare or fox.

Other objects reside in the specific mechanical means which I employ for concealing the conveying means, for supporting the dummy animal, and for imparting movement to said conveyor and dummy animal as desired by the operator.

With the foregoing and other objects in view, my invention consists of the arrangement and combination of parts as hereinafter described and claimed, and while my invention is not restricted to the exact details of the construction shown herein, yet, for the purpose of illustrating a particular embodiment thereof, reference is had to the accompanying drawings, in which like reference characters designate the same parts in the several views, and in which, Figure 1 is a plan view of a race course for dogs laid out as described in my invention.

Figure 1:
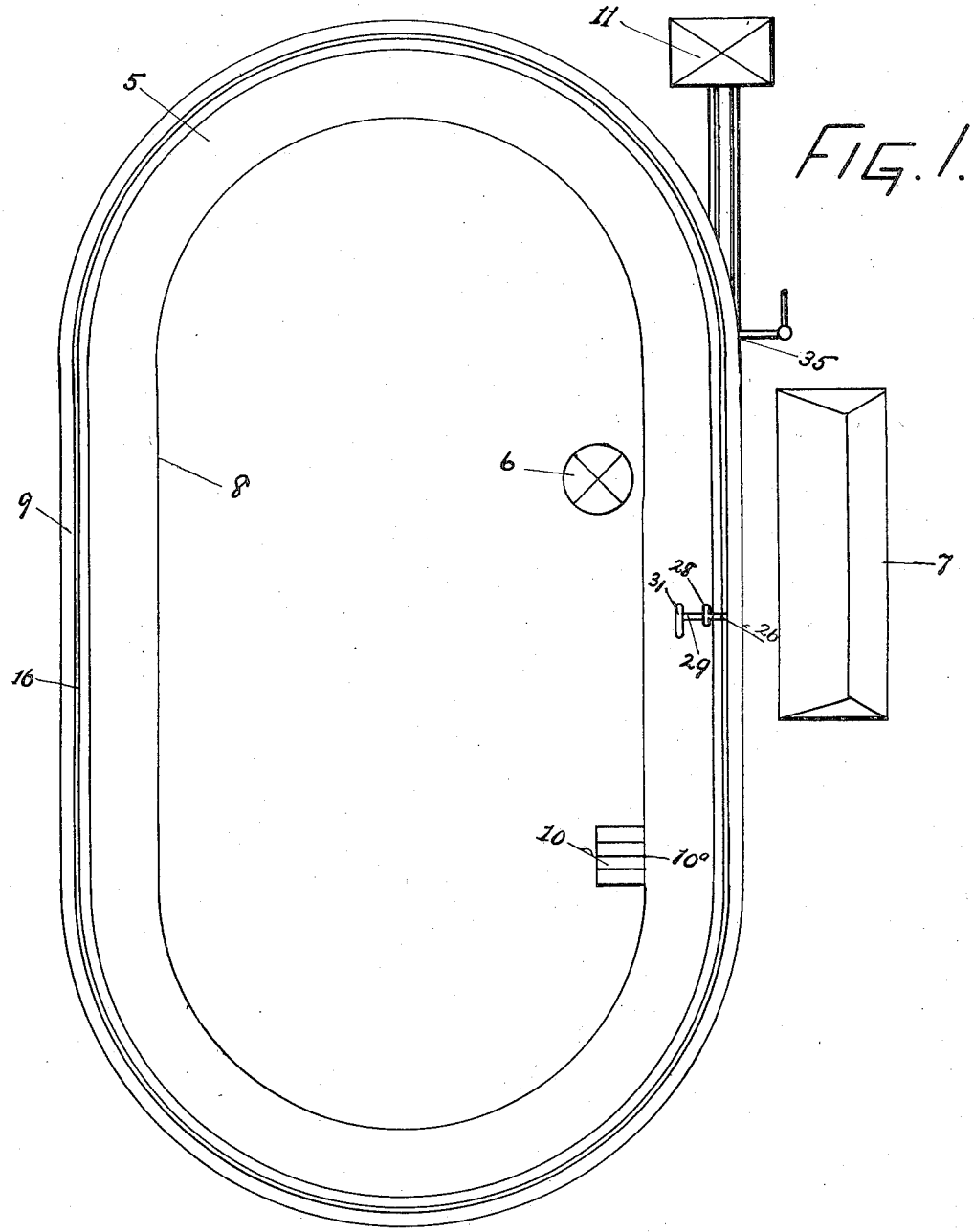
Figure 2:
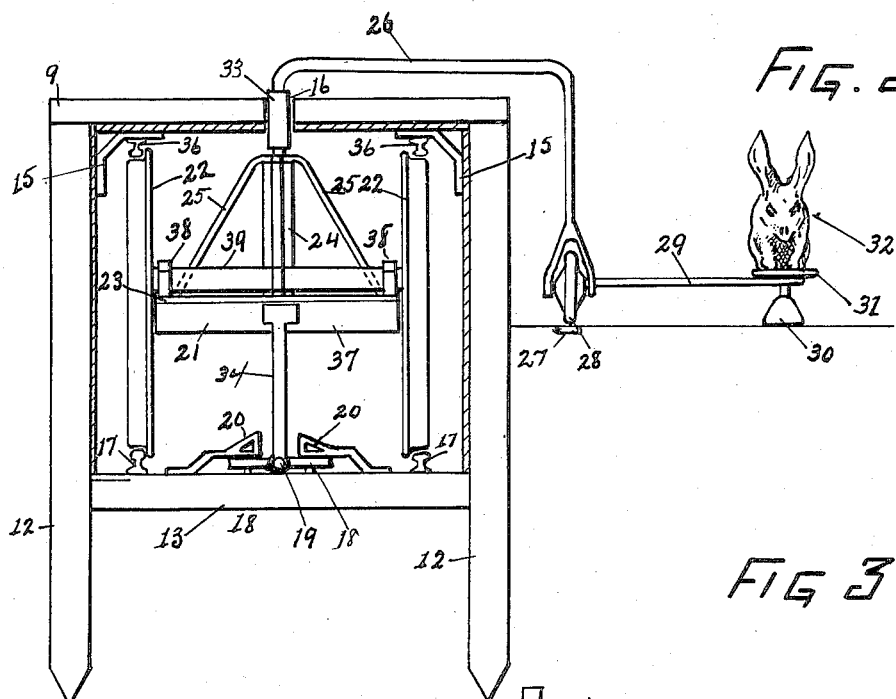
Figure 2 is a front elevation of my conveyor car, with a section view of the housing enclosing it.
Figure 3:
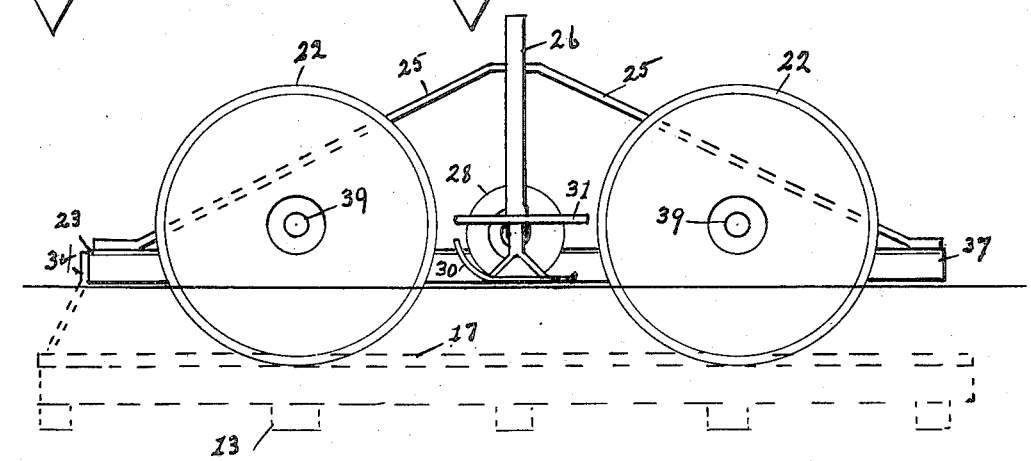
Figure 3 is a side elevation of the conveyor car with the housing removed.

In the construction of my said invention, I lay out a suitably graded race course as 5, suitable for dogs or other animals to run upon, and of the size desired for the particular field obtainable. At 6 I have provided a judges' stand for the judges of the races, and if desired for the operator of the conveyor hereinafter described. At 7 I provide a suitable grand stand for spectators. At 11 I have provided a suitable power plant, supplied with a drum for operating the cable hereinafter described. This power plant may be electrical, or any other suitable power, and may be controlled from the power plant, or from the judges stand, if preferred to control the speed of the dummy animal hereinafter described.

The inner edge of the race track I have fenced with any open fencing, 8 to prevent the dogs from leaving the track and also to not obstruct the view of the track by the judges and spectators. At the outer edge of the race track I have provided a continuous boxing or housing 9 which acts as a fence to the outer edge of the race track, and also forms a housing for completely covering and concealing the mechanism employed by me to convey the dummy animal along the race track as hereinafter described. At a suitable point as 10 along said race track I have provided a cage for the dogs which are entered in the race to be detained behind the barrier $10^a$ until the race starts, when the barrier is dropped, and the dogs permitted to chase the dummy animal around the race track at their utmost speed.

In the construction of the boxing or housing 9 I have preferably excavated the earth for a suitable distance, and set the posts 12 on each side of the housing at suitable distances apart. These posts are firmly connected by the bed plates 13 shown, and the inner sides of the housing are covered with any suitable boards to suitably enclose it against the weather and for concealment of the parts and conveyor to be operated therewithin. The roof is supported from the top of the frame and also from the sides by means of the brackets 15 placed at suitable distances along the said housing. At 16 I have provided a continuous opening in the roof, running the entire length of the housing.

On the bed plates 13 I have laid a two rail track as 17, usually laid of light weight T-rails, as shown, and between said rails I have provided sheeves, at suitable distances apart, as 18, for carrying the cable 19 hereinafter described. Each sheeve has a guard as 20 to prevent the cable from running off the sheeve. On the under side of the roof I have provided the additional rails 36 which are in proximity to the upper edges of the car wheels hereinafter described, and are provided to contact with said car wheels in case they should rise off the lower rails 17, and thereby prevent any chance of said car wheels jumping off the rails 17.

I have provided a suitable conveyor car, as 21 of a suitable size for operation upon the rails 17 within said housing. Said car is provided with the frame 37 and the platform or decking 23. At 38 are attached suitable bearings for the axles 39 of the car wheels 22. These car wheels are of the usual flange type, and I usually employ four for the car. At a central point on the platform of the car 23 I have provided an upright 24, which is suitably braced from all four sides by the braces 25 extending to the platform at its four sides, and on the top of said upright 24 I have attached the arm 26, of a shape as shown, which projects out through the opening 16 in the top of the housing, and outward toward the race track, and downward toward the ground, ending in a fork of suitable shape for furnishing bearings for the tractor wheel 28, which said wheel is designed to run upon a board track or runway 27 provided in the pathway thereof. Extending toward the race track from the forked end of the arm 26 is a second arm 29, which is substantially horizontal and which is supported at its free end by the shoe 30, designed to slide along the ground of the race course as the conveyor carries said arm and shoe about said race track as hereinafter described. Mounted upon said arm 29 above the shoe is a platform of suitable size as 31 and upon this in turn is mounted a dummy animal or stuffed lure, as a hare, 32, in plain view of the dogs or animals which are to pursue it.

At 33 on the arm 26 I have provided a suitable roller for bearing against the sides of the opening 16 as the arm is carried along, and thereby reducing the friction which would be caused by contact of said arm against the sides of said opening in its passage around the said track.

At 34 on the forward end of said car 21 I have provided the gripper arm shown for attaching said car to the cable in order to move said car along the track as the cable is moved by the drum in the power house.

At the end of the home stretch, as at 35 I have provided a trap-door and a switch, for the passage of the car and the dummy lure through the trap door and out of sight of the dogs at the end of the race. This switch and trap door may be operated by any suitable means (not shown) which are no part of my said invention.

The method of operating my said invention is as follows, viz: The dogs entered in the race are confined in the cages at 10, behind any suitable barrier as 10ª until time for the race to start. The car 21 is then backed out upon the track, and started around the track by means of the cable and power supplied by the power plant. As the car carrying the lure at the end of the arm 26 passes in front of the cages, the barrier is dropped, and the dogs are released. As they have seen the lure as it passed in front of their cages, they immediately give chase to catch it. The lure is carried along the course ahead of the dogs past the judges' stand and grand stand, and once or more times around the track, with the dogs in pursuit. The speed of the car and the lure may be gauged to keep the lure just enough in the lead to induce the dogs to their utmost speed to catch it. When it is desired to end the race, the switch is thrown, switching the car upon the side track, when the lure passes through the trap door at 35, and out of sight of the dogs. The dogs are then retrieved by their owners.

It will be seen from the foregoing, that the dogs are free to run at their topmost speed, as they are free from any harness, or other restraining mechanism. It will also be seen that the lure may be kept at any distance in advance to bring them up to their best speed. It will be further seen, that there is no danger of the dogs catching the lure, as when live lures as rabbits are employed in dog racing, and thereby ending the race without securing the timing of the dogs for the full course. It will also be seen that my dog racing course is not subject to the objection that it is cruelty to animals, as where live animals are used for the dogs to chase, and are often caught and killed.

While I have shown my invention as employing a cable for imparting motion to the conveyor car, it will be apparent that any other suitable means may be equally well employed to propel the car without departing from the spirit of my invention.

While I have shown the arm carrying my lure as having both a wheel and a shoe for supporting it upon the course, it will be apparent that either of these may be omitted without departing from the spirit of my said invention, as one may support said arm to the satisfaction of the operator.

Having thus described my said invention, what I claim and desire to secure by Letters Patent, is the following:

1. A racing course for dogs comprising a race course for dogs, a car mounted upon wheels travelling upon a rail track adjacent said course, an arm carried by said car having a wheel for running upon the ground and provided also with a rigid laterally extending arm projecting beyond the wheel, a lure mounted upon said laterally projecting arm in spaced relation with the wheel in view of the dogs and means for operating said car.

2. A racing course for dogs and the like animals comprising a racing course, a rail track parallel and adjacent said course, a carrier having wheels to run upon said rails, said carrier having an arm extending toward the race course, a wheel rotatably mounted in bearings in said arm and adapted to rotate upon the course, a shoe near the end of said arm adapted to slide along the course, a lure mounted upon said arm in view of the dogs and means for propelling the carrier along the rail track.

3. In a racing course for dogs and the like, the combination with a race course of a covered rail track having upper and lower rails, the covering having a continuous opening lengthwise thereof, a carrier having wheels for operation between said upper and lower rails, a cable between the rails of said track, means carried by the carrier for attachment to said cable, an arm attached to said carrier, a lure mounted upon said arm and means for imparting motion to said cable.

4. In a racing course for animals, a race course, a covered rail track adjacent said course, the covering having a continuous opening lengthwise of the said covering, a car having wheels operating upon said rails, an arm attached to said car and extending through the opening in the covering, a wheel mounted in bearings in said arm for rotating upon the course, a shoe attached to said arm also for contact with said course, a lure mounted upon said arm, a cable between the rails, means upon the car for attachment of the car to said cable, and means for operating said cable.

5. A racing course for dogs comprising a race course, a rail track parallel to and adjacent said course, a carrier having wheels to operate upon said rails, a covering over said rail track and carrier and having a continuous opening arranged lengthwise of the roof of said covering, additional rails mounted on the under side of the roof of the covering adjacent the upper side of the wheels, an arm attached to the carrier extending out through said opening, a roller upon said arm in said opening, a wheel adapted to rotate upon the course mounted in bearings in said arm, a shoe adapted to slide upon the course attached to said arm, a lure mounted upon said arm in view of the dogs, and means for operating said carrier.

6. A racing course for dogs comprising a race course, a carrier mounted upon wheels operated upon a rail track adjacent said course, a laterally projecting arm attached to said carrier and provided with a supporting wheel and having a shoe near its end adapted to engage the course, a lure mounted upon said laterally projecting arm in view of the dogs and means for imparting motion to said carrier.

In testimony whereof, I have duly signed and executed the accompanying specifications in the presence of two subscribing witnesses, whose names are hereunto also subscribed.

OWEN P. SMITH.

Witnesses:
  GEO. SAWYER,
  DANIEL O. EDGECOMB.